Sept. 7, 1965  E. J. FIEKERS ET AL  3,204,265
APPARATUS FOR FORMING FASTENERS WITH RECTANGULAR SHANKS
Filed Jan. 24, 1962  2 Sheets-Sheet 1
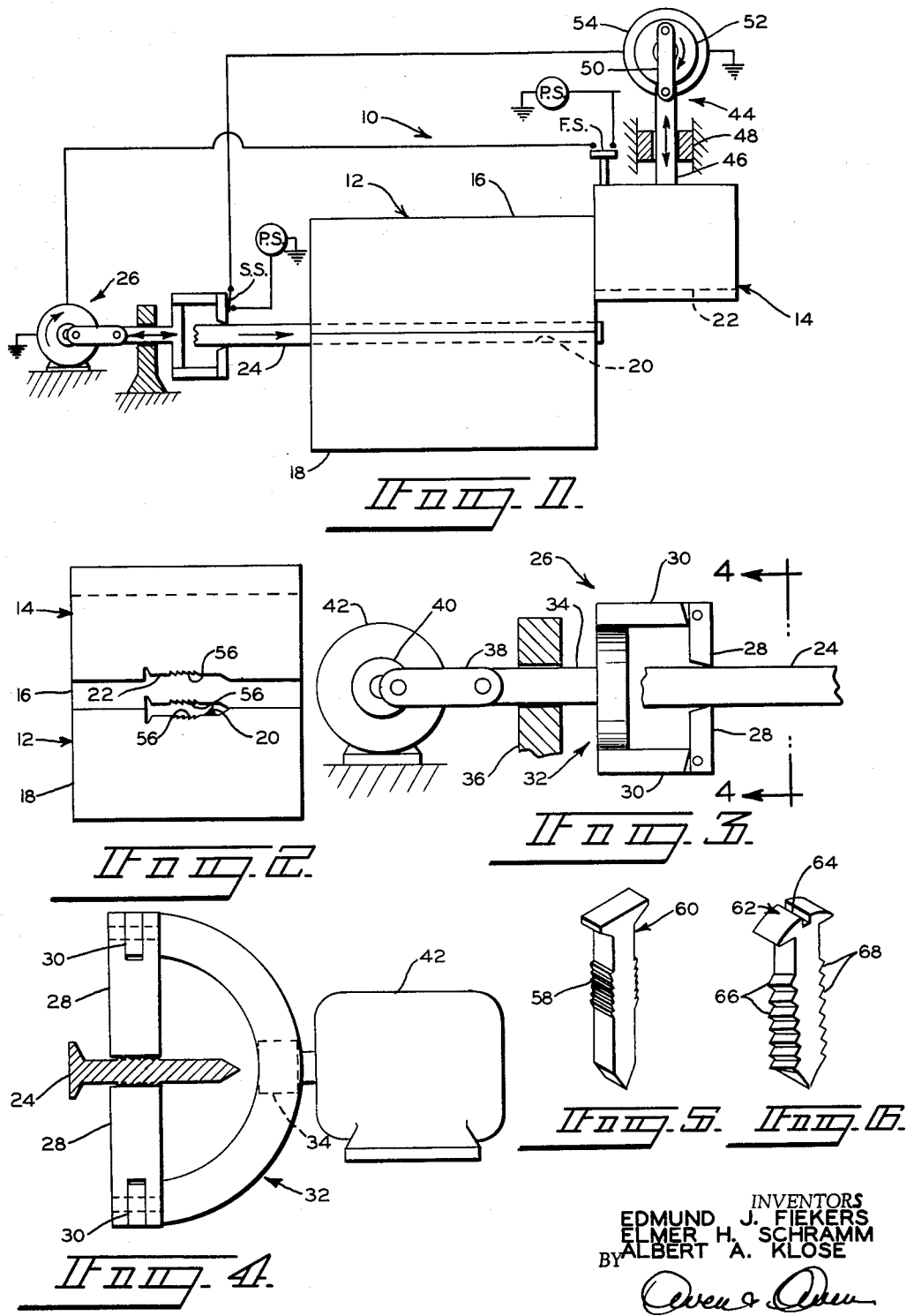
INVENTORS
EDMUND J. FIEKERS
ELMER H. SCHRAMM
ALBERT A. KLOSE
BY
ATTORNEYS

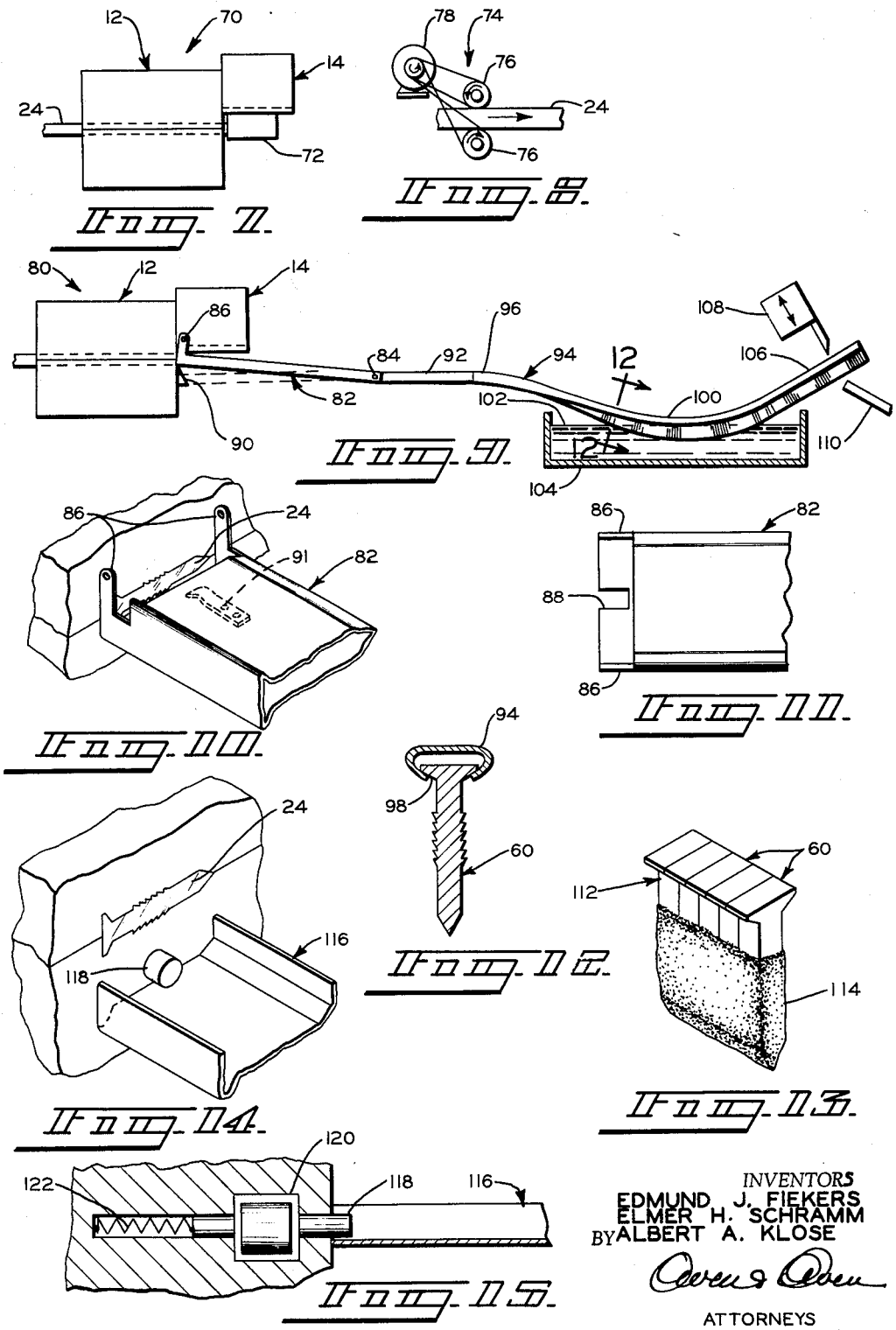

3,204,265
APPARATUS FOR FORMING FASTENERS WITH
RECTANGULAR SHANKS
Edmund J. Fiekers, Fremont, and Elmer H. Schramm and
Albert A. Klose, Dayton, Ohio, assignors to Duratile of
Ohio, Inc., Fremont, Ohio, a corporation of Ohio
Filed Jan. 24, 1962, Ser. No. 168,438
4 Claims. (Cl. 10—2)

This invention relates to a method and appaartus for making fasteners with rectangular shanks.

Nails with rectangular or, more specifically, square shanks were once commonly used for almost every application. However, in more recent years, square-shank nails have been applied to only a few uses, such as for nailing hardwood flooring and for attaching horseshoes to horses. The drastic decline in the use of square-shank nails has not occurred because round-shank nails are better, since square-shank nails actually have some advantages, such as better holding power and, in some instances, a lesser tendency to split the wood in which they are driven. On the contrary, the decline in the use of square nails has occurred because round nails can be made much more cheaply and more rapidly out of wire. Square nails are now stamped from heavy metal sheets which results in high costs and low production rates, along with a considerable amount of waste material.

The present invention provides an improved method and apparatus for making square nails which are much less expensive than those made by presently known techniques and brings the cost of them down to a point such that they can be used economically in many applications. The present invention is also effective for producing strips of nails for power nailing guns. At the present, the strips of nails for the power guns are made from round-shank nails with narrow heads; after forming the nails are laid side-by-side by a collating process, after which the shanks are adhered by a suitable adhesive to form the strip. With the new method and apparatus, the collating process is eliminated and the strips of nails can be made directly by a continuous process.

According to the new method and apparatus, a strip of metal is first formed with a cross sectional shape similar to that desired for the final nail product. This can be done, for example, by hot-rolling, cold-rolling, or extruding. The strip is then fed through a die block having a passage of substantially the same shape as the strip with a shear block being located adjacent the other end of the die block opposite to the end through which the strip is fed. The shear block shears off the strip into nails as it protrudes from the die block a distance equal to the thickness of one nail to provide the desired product. The die block and shear block can be provided with suitable ridges to form serrations on the shanks of the final product in order to increase the holding power thereof. Further, the ridges can be at angles so that the final product can function similarly to a sheet metal screw, as will be more apparent subsequently. Because the fasteners are sheared from a strip held in a constant position, they can be caught by suitable conveying means and fed through apparatus for coating the shanks of them with adhesive whereby strips of the fasteners for power nailing guns or automatic screw drivers can be made directly and continuously.

It is, therefore, a principal object of the invention to provide a method and apparatus for making rectangular-shank fasteners more rapidly and at less cost than heretofore.

Another object of the invention is to provide an improved method and apparatus for making rows or strips of fasteners for power nailing guns or automatic screw drivers.

Other objects and advantages of the invention will be apparent from the following detailed description of the preferred embodiments thereof, reference being made to the accompanying drawings, in which:

FIG. 1 is a somewhat schematic, side view in elevation of a die block and shear block embodying the principles of the invention;

FIG. 2 is a front view of the die block and the shear block shown in FIG. 1;

FIG. 3 is an enlarged, side view in elevation of mechanism for feeding a strip of metal through the die block of FIGS. 1 and 2;

FIG. 4 is a front view taken along the line 4—4 of FIG. 3;

FIG. 5 is an enlarged view in perspective of a nail with a rectangular shank made with the apparatus shown in FIGS. 1-4;

FIG. 6 is an enlarged view in perspective of a rectangular-shank fastener similar to a sheet metal screw which can be made with the apparatus shown in FIGS. 1-4;

FIG. 7 is a schematic side view in elevation of a modified die block and shear block embodying the principles of the invention;

FIG. 8 is a schematic, side view of mechanism for feeding a strip through the die block shown in FIG. 7;

FIG. 9 is a somewhat schematic view in elevation of apparatus for continuously producing strips of nails for power nailing guns;

FIG. 10 is an enlarged, fragmentary view in perspective of a receiving chute employed with the apparatus of FIG. 9;

FIG. 11 is a plan view of the chute shown in FIG. 10;

FIG. 12 is a view in cross section taken along the line 12—12 of FIG. 9;

FIG. 13 is a view in perspective of part of a row of nails made with the apparatus of FIGS. 9–12;

FIG. 14 s a view in perspective of a modified receiving chute and feed mechanism; and FIG. 15 is a view in vertical cross section of the receiving chute and feed mechanism of FIG. 14.

Referring to the drawings, and more particularly to FIGS. 1 and 2, apparatus for making fasteners with rectangular shanks and heads is indicated at 10 and includes a die block 12 and a shear block 14. The die block 12 includes an upper half 16 and a lower half 18 which are suitably joined and which form a passage 20 extending longitudinally therethrough. The shear block 14 includes a recess 22 extending longitudinally thereof which is aligned with the passage 20 when in operative position, with the contour of the recess 22 being the same as the upper half of the passage 20. The upper and lower halves 16 and 18 of the die block 12, as well as the shear block 14, are of identical shape and all three can be made from a single body which is cut laterally into sections. The shear block 14 rides against an end of the die block 12 and either or both of the adjacent faces can be ground, when worn, to provide a fresh shearing surface. With this arrangement, the die block 12 and the shear block 14 are relatively inexpensive and have very long lives.

A hot-rolled strip 24 which is fed through the passage 20 is of approximately the same size and shape as the passage so that the strip 24 is held firmly during the shearing operation. The upper surface of the strip 24 is also of the same contour as the recess 22 so that the shear block 14 engages all portions of the strip 24 uniformly, thereby reducing the chance for distortion of the strip 24 during shearing.

The strip 24 is fed through the passage 20 by any suitable feeding means indicated at 26, the strip being moved in increments of a length equal to the thickness desired for the final product. In this instance, the feeding mechanism 26 includes a pair of pivotal dogs 28 (FIG. 3) pivotally mounted on arms 30 of a drive yoke 32 which is curved (FIG. 4) to enable the strip 24 to pass thereby. The yoke 32 has a shank 34 extending through suitable guide and support means 36 and pivotally attached to a drive link 38. The link 38 is pivoted to a disc 40 which is driven through a motor 42.

The yoke 32 is driven in an oscillatory manner, in a horizontal path, when the motor 42 rotates the disc 40 and drives the link 38. When the yoke 32 moves toward the right in FIG. 3, the dogs 28 engage the shank portion of the strip 24 and cause it to move through the passage 20 in the die block 12. The extent of the rearward pivotal movement of the dogs 28 is limited by the arms 30 of the yoke 32 to prevent the possibility of the dogs 28 moving beyond a center position. When the yoke 32 moves in the opposite direction, the dogs 28 merely slide on the strip to enable them to return to a new position in order to once again engage and drive the strip 24 forwardly. The stroke of the yoke 32 is equal to the thickness of the fastener to be sheared from the strip 24.

The shear block 14 can be moved vertically by any suitable means 44. In this instance, the mechanism 44 includes a drive rod 46 suitably supported by a guide block 48 and pivotally attached to a link 50 mounted on a disc 52 which is driven by a motor 54.

When the block 14 returns to its upper position, it closes a feed switch F.S. which initiates one revolution of the motor 42 thereby to move the strip 24 forwarly one increment or a distance equal to the thickness of the nail product. In addition, when the yoke 32 of the feed mechanism 26 reaches its forward position, it closes a shear switch S.S. which initiates one revolution of the shear block motor 54 to drive the shear block 14 through one cycle and shear one fastener from the strip 24. Each of the switches F.S. and S.S. are connected to a suitable source of power P.S.

In some instances, it is desired to provide serrations or teeth on the fastener to increase the holding power thereof. For this purpose, the upper and lower surfaces of the passage 20, as well as the recess 22, have ridges 56 which produce finished serrations or teeth 58 on a completed fastener or nail 60 (FIG. 5). Preferably, relatively blunt ridges are formed on the strip 24 during the forming operation so that the ridges 56 in the passages 20 and the recess 22 simply finish form the rough ridges. This is accomplished when the shear block 14 moves downwardly to cause the recess 22 to engage the top of the strip 24. The ridges 56 of the recess 22 thus finish form the serrations 58 on the upper side of the nail 60. As the shear block 14 moves downwardly, it presses the lower surface of the strip 24 against the ridges 56 of the lower half of the passage 20 to form the serrations 58 on the next portion of the strip 24 to be sheared. Thus, each time the shear block 14 moves downwarly, it finish forms the serrations 58 on the upper half of the resulting nail 60 and finish forms the serrations on the next portion of the strip 24 to be sheared during the next stroke of the shear block 14. The serrations 58 on the nails 60 thereby are formed on two sequential strokes of the shear block 14.

If desired, the nails 60 or similar fasteners can be made of alloy materials and first heat-treated to provide greater holding power. They can also be given suitable heat-treatment to make them adaptable for driving into concrete when used in power nailing guns.

A sheet metal-type screw 62 is shown in FIG. 6, which screw can be made with apparatus similar to that shown in FIGS. 1 and 2. In this instance, the passage 20, the recess 22, and the strip 24 are shaped slightly differently so that the resulting screw 62 has a half-round head. The strip 24 in this instance, also is provided with a slot extending longitudinally thereof to produce a slot 64 in the head of the screw 62, with the slot in the strip being formed before the strip enters the passage 20. While this is suitable for extruded strips, hot-rolled or cold-rolled strips do not have a slot. In that case, the head of the screw driver is simply shaped to fit over the screw head and provide driving engagement therewith. In addition, the ridges in the passage 20 and the recess 22 differ slightly from those of FIGS. 1 and 2. The ridges in the lower half 18 of the die block 12 and in the shear block 14 are cold formed, for example, at an angle of 20°, for example, to the longitudinal extent of the passage 20 and the recess 22, while the upper half 16 does not have any ridges. The strip from which the screws 62 are made does not have any teeth and the strip only slides on the angular ridges of the lower half 18 as it moves through the passage 20. Teeth 66 and 68 are formed by the shear block 14 and the lower half 18 of the die block 12 as the fasteners are sheared, in the same manner as before.

Slightly modified nail-producing apparatus 70 is shown in FIGS. 7 and 8. In this instance, the apparatus 70 includes the same die block 12 and the same shear block 14 but also includes a stop block 72 affixed to the lower surface of the shear block 14. The block 72 is offset from the shear block 14 by a distance equal to the thickness of one fastener. A modified feed mechanism 74 is also used in place of the feed mechanism 26. The feed mechanism 74 in this instance simply includes a pair of opposed feed rollers 76 which engage the shank portion of the strip 24, the feed rollers 76 being driven by a suitable motor 78. The feed rollers 76 lightly frictionally engage the strip 24 so as to move it through the passage 20 only until the strip 24 engages the offset stop block 72. This occurs when the shear block 14 is in the upper position and, once the end of the strip 24 engages the stop block 72, it remains there until the shear block 14 has sheared off the protruding portion of the strip 24 and has again returned to its upper position. Until this occurs, the rollers 76 simply slip relative to the strip 24 and urge it toward the right until the shear block 14 returns to its upper position and the strip can once again move a distance of one fastener thickness to the stop block 72. The feeding mechanism of FIGS. 7 and 8 is somewhat more simple and direct than the feed apparatus of FIGS. 1 and 2. However, the stop block 72 must be adjusted relative to the face of the shear block 14 each time the face is ground to provide a new shearing surface.

Referring to FIGS. 9–13, a method and apparatus are shown for producing rows of the nails 60 which are particularly adapted for use in power nailing guns. Such rows of nails are now made by individually forming round shank nails with narrow heads. These individual nails are then collated into a side-by-side relationship, after which the shanks are coated with a suitable adhesive to provide the rows which can be cut to any suitable length. For a similar purpose, rows of the rectangular-shank nails 60 can be made with apparatus indicated at 80 in FIG. 9. The apparatus 80 includes the die block 12 and the shear block 14, either with or without the stop block 72, depending on the type of feed mechanism used.

The sheared nails 60 are collected by a receiving chute 82 which extends away from the passage 20 and is pivoted at a point 84 spaced a substantial distance therefrom. The chute 82 is also pivotally connected by ears 86 to the die block 14 and moves upwardly and downwardly therewith, but is positioned so as not to cross the mouth of the passage 20 and interfere with the movement of the strip 24 therethrough. Thus, in the upper position, the chute 82 only circumvents the lower portion of the passage 20, as shown in FIG. 10. The end of the chute adjacent the mouth of the passage 20 is open on its upper side a distance slightly greater than the thickness of the nail to be produced and is covered from there at least to a point near its pivot point 84 to prevent the nails from falling out of the chute 82 during the reciprocating movement thereof. The end of the chute 82 has a centrally located notch 88 which cooperates with an inclined, pushing plate 90 suitably located on the die block 12 below the passage 20. When the tube 82 moves downwardly with the shear block 14, the plate 90 pushes the newly-sheared nail from the open end of the chute 82 into the covered portion thereof. Thus, the newly-sheared nail cannot bounce out of the tube 82 once it is pushed into it. The plate 90 also pushes the previously-deposited nails 60 down the chute to advance them one nail thickness at a time. The chute 82 also has a leaf spring 91 near the open end to engage the last nail deposited and prevent it from falling back into the open end and thereby block the next nail.

The other end of the chute 82 is attached to a flexible connecting tube 92 which can be of a plastic material, for example, and is of the same shape as the chute 82. The tube 92 merely provides a flexible connection between the moving chute 82 and a stationary, conveying tube 94. A first portion 96 of the conveying tube 94 can be shaped similarly to the guide tube 82 but is then twisted 90° and provided with a slot 98 (FIG. 12) through which the shanks of the nails 60 can protrude, the nails being rotated 90° also. An intermediate portion 100 of the conveying tube 94 is of shallow U-shaped configuration and is located in part just above a pool 102 of adhesive located in a suitable vat 104. The intermediate portion 100 is positioned to dip just the shanks of the nails 60 in the pool 102 as they are pushed along the tube 94, after which the adhesive dries as the nails 60 continue up a straight inclined portion 106 of the tube 94. The adhered nails can then be cut into rows of suitable lengths as they pass beneath a cutter 108 and are then fed down a trough 110 and packaged. The finished product is shown in FIG. 13 and includes a row designated 112 of the nails 60, the shanks of which are adhered together by a coating 114 of the adhesive in the pool 102. The rows 112 are then ready for use in power nailing guns. The screws 62 can also be formed in the rows 112 for use in automatic screw drivers.

If desired, a stationary collecting chute 116 (FIGS. 14 and 15) can be used in place of the chute 82 and located in a fixed position below the pasage 20 and slightly below the lower extremity of the stroke of the shear block 14. The shear block 14 can then push the sheared nail into the end of the chute 116, at which time a plunger 118 can push the sheared nail approximately the thickness of a nail down the chute. The plunger 118 is partially enclosed in a coil 120 to which current is supplied when the shear block 14 reaches the lower end of its stroke, the shear block actuating a suitable switch for this purpose. The plunger 118 then moves the nails down the chute 116 and is returned by a spring 122. In this instance, the top of the chute 116 can be opened because the chute does not move and there is little danger that the nails will be pushed out of the top of it.

Various modifications of the above-described embodiments of the invention will be apparent to those skilled in the art, and it is to be understood that such modifications can be made without departing from the scope of the invention, if they are within the spirit and tenor of the accompanying claims.

What we claim is:

1. Apparatus for producing fasteners with rectangular shanks, which apparatus comprises a die block having a passage therein, the lateral shape of which is substantially similar to the profile of the fastener to be produced, a shear block located adjacent one end of said die block, said shear block having a recess which is opposite to and of substantially the same size and shape as one-half of the passage, at least the recess and the half of said passage opposite said recess of said shear block having ridges extending longitudinally thereof and substantially parallel to one another for shaping serrations on opposite sides of the fastener, means for feeding a strip in increments through said passage from the end thereof opposite the shear block, each increment being of a magnitude substantially equal to the desired thickness of the fastener and means for moving said shear block across the adjacent end of the passage each time the strip has been moved the desired increment by said feed means.

2. Apparatus according to claim 1 wherein said ridges in said recess are offset with respect to the ridges in the opposite half of said passage to shape offset serrations on the fastener, to enable it to function similarly to a sheet metal-type screw.

3. Apparatus for producing fasteners with rectangular shanks, which apparatus comprises a die block having a passage therein, the lateral shape of which is substantially similar to the profile of the fastener to be produced, a shear block located adjacent one end of said die block, said shear block having a recess which is of substantially the same size and shape as one-half of the passage, means for feeding a strip in increments through said passage from the end thereof opposite the shear block, each increment being of a magnitude substantially equal to the thickness of the fastener, means for moving said shear block across the adjacent end of the passage each time the strip has been moved the desired increment by said feed means, collecting means located near the shear block end of the passage and including a chute movable with said shear block and located therebelow to receive each sheared fastener, and means for moving said fasteners including an inclined plate located below the shear block end of said passage and cooperating with said chute to move said fasteners along said chute when said chute moves downwardly past said inclined plate during downward movement of said shear block.

4. Apparatus for producing fasteners with rectangular shanks, which apparatus comprises a die block having a passage therein, the lateral shape of which is substantially similar to the profile of the fastener to be produced, a shear block located adjacent one end of said die block, said shear block having a recess which is of substantially the same size and shape as one-half of the passage, means for feeding a strip in increments through said passage from the end thereof opposite the shear block, each increment being of a magnitude substantially equal to the thickness of the fastener, means for moving said shear block across the adjacent end of the passage each time the strip has been moved the desired increment by said feed means, collecting means located near the shear block end of said passage and including a stationary chute located below the passage and below the lower extremity of the shear block stroke, and said moving means including plunger means actuated by said shear means when said shear means substantially reaches its lowermost position to engage the most recently deposited fastener and push it along said chute.

References Cited by the Examiner

UNITED STATES PATENTS

| 107,160 | 9/70 | Bruso | 10—25 |
| 335,260 | 2/86 | Weeks | 10—34 |
| 358,522 | 3/87 | Wickersham | 10—32 |

(Other references on following page)